United States Patent
Raaf

(10) Patent No.: US 7,400,654 B2
(45) Date of Patent: Jul. 15, 2008

(54) METHOD FOR SYNCHRONIZING A RECEIVER WITH A TRANSMITTER

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 1116 days.

(21) Appl. No.: 10/276,005

(22) PCT Filed: May 23, 2001

(86) PCT No.: PCT/DE01/01980

§ 371 (c)(1),
(2), (4) Date: Nov. 12, 2002

(87) PCT Pub. No.: WO01/91337

PCT Pub. Date: Nov. 29, 2001

(65) Prior Publication Data

US 2003/0156574 A1      Aug. 21, 2003

(30) Foreign Application Priority Data

May 23, 2000   (EP)   .................... 00111115

(51) Int. Cl.
*H04J 3/06*   (2006.01)
*H04B 1/00*   (2006.01)

(52) U.S. Cl. .................. 370/514; 375/145; 375/149

(58) Field of Classification Search .................. 375/146; 370/324, 350, 245, 335, 313, 442, 514, 349, 370/280, 281, 342, 395.62, 379, 501, 507, 370/509, 510, 511, 512, 513

See application file for complete search history.

(56) References Cited

U.S. PATENT DOCUMENTS

| | | | |
|---|---|---|---|
| 6,005,854 A | | 12/1999 | Xu et al. ..................... 370/335 |
| 6,385,259 B1 * | | 5/2002 | Sung et al. .................. 375/343 |
| 6,526,091 B1 * | | 2/2003 | Nystrom et al. ............. 375/142 |
| 6,567,482 B1 * | | 5/2003 | Popovic' .................... 375/343 |
| 6,891,882 B1 * | | 5/2005 | Hosur et al. ................ 375/147 |
| 7,031,371 B1 * | | 4/2006 | Lakkis ....................... 375/146 |
| 7,039,036 B1 * | | 5/2006 | Dabak et al. ................ 370/342 |
| 7,095,723 B2 * | | 8/2006 | Sezgin et al. ............... 370/324 |
| 2002/0150188 A1 * | | 10/2002 | Rudolf ....................... 375/354 |

FOREIGN PATENT DOCUMENTS

| | | |
|---|---|---|
| EP | 0 586 090 | 3/1994 |
| WO | WO 00/13358 | 3/2000 |

OTHER PUBLICATIONS

Title: An overview of air interface multiple access for IMT-2000/UMTS, Author: Ramjee Prasad, Title Date: Sep. 1998.*

(Continued)

*Primary Examiner*—Seema S. Rao
*Assistant Examiner*—Christine Duong
(74) *Attorney, Agent, or Firm*—Bell Boyd & Lloyd LLP

(57) ABSTRACT

A method is provided for synchronizing a receiver with a transmitter, wherein a first synchronization signal with a multiplicity of second synchronization signals is transmitted from the transmitter to the receiver, a set of second synchronization signals is subdivided into used code sets and at least one unused code set in such a way that the maximum in the peak values of the cross-correlation functions of the second synchronization signals, which are determined by a used code set, with a first synchronization signal is minimal.

13 Claims, 2 Drawing Sheets

OTHER PUBLICATIONS

3rd Generation Partnership Project; Technical Specification Group Radio Access Network; Spreading and modulation (TDD) (Release 1999) 3G TS 25.223 V3.2.0 (Mar. 2000), pp. 10-11.*

TSG-RAN Working Group 1 meeting No. 5, Jun. 1-4 Cheju, Korea pp. 1-6.

TSG-RAN Working Group 1 (Radio) meeting #3 Eskilstuna, Sweden Mar. 22-26, 1999, pp. 1-8.

ETSI STC SMG2 UMTS Layer 1 Expert Group Stockholm, Sweden Oct. 14-16, 1998, pp. 1-7.

3GPP TSG RAN WG1#13 Tokyo, Japan May 22-25, 2000.

3G TS 25.223 3rd Generation Partnership Project; Technical Specification Group Radio Access Network; Spreading and modulation (TDD) (Release 1999).

* cited by examiner

METHOD FOR SYNCHRONIZING A RECEIVER WITH A TRANSMITTER

BACKGROUND OF THE INVENTION

The present invention relates to a method for synchronizing a receiver with a transmitter; in particular, within a mobile radio network.

The rapid technical development in the field of mobile communications has led in recent years to the development of new mobile radio systems of the third generation. An essential role is played in this case by the so-called UMTS (Universal Mobile Telecommunications System), which is based at least partly on the WCDMA (Wideband Code Division Multiple Access) technology. The air interface of this system, UTRA (UMTS Terrestrial Radio Access), forms a central element in this system. This air interface can be implemented in accordance with the prior art via two different types of duplex; TDD (Time Division Duplex) and FDD (Frequency Division Duplex), respectively.

For the purpose of synchronizing a receiver (mobile station, subscriber station) with a transmitter (base station), it is known to transmit a first synchronization signal (synchronization sequence, synchronization code, code word) PSC (Primary Synchronization Code) for detecting a cell and/or a base station, and second synchronization signals (synchronization sequence, synchronization code, code word) SSC (Secondary Synchronization Codes) for the purpose of identifying different parameters of the detected cell and/or base station from the transmitter (base station) to the receiver (mobile station). Such a synchronization is also called cell search.

It is also known in this case from [1] and [5] to use the same PSC and the same SSCs for UTRA FDD and UTRA TDD.

However, the situation arises in this case that for the purpose of synchronization with subscriber stations UTRA FDD requires the use of 16 different SSCs, whereas for the purpose of synchronization with subscriber stations UTRA TDD requires the use of only different SSCs.

The set of 16 SSCs is grouped in UTRA TDD into the five code sets, of which four code sets, which each include three SSCs, are used in UTRA TDD for synchronization, and one code set, which includes four SSCs, is not used in UTRA TDD for synchronization. Three SSCs of a code set are emitted for synchronization purposes in parallel with the PSC in the time slots to which a PSCH (Primary Synchronization Channel) is assigned.

The PSC is a so-called "Generalised hierarchical Golay Sequence" with good a periodic autocorrelation properties that is known per se from [2].

The PSC is accordingly defined by the following construction rule:

Let $a = \langle x_1, x_2, x_3, \ldots, x_{16}\rangle = \langle 1, 1, 1, 1, 1, 1, -1, -1, 1, -1, 1, -1, 1, -1, -1, 1\rangle$ be a sequence of 16 elements.

The PSC is then generated by modulating "a" with the aid of a complementary Golay sequence. The sequence a is therefore repeated, and with each repetition all the elements of the sequence a are multiplied by the value, corresponding to the repetition, of the complementary Golay sequence. Subsequently, all the elements are multiplied by the complex number (1+j). This generates a complex sequence that has identical real and imaginary parts.

The PSC $C_p$ is therefore defined as:

$C_p = \langle y(0), y(1), y(2), \ldots, y(255)\rangle$, wherein it holds that:

$y = (1+j) \times \langle a, a, -a, -a, a, -a, -a, a, a, a, -a, a, -a, a, a\rangle$; the value with the smallest index $y(0)$ corresponds in this case to the first symbol or chip transmitted in a time slot.

The 16 SSCs $\{C_0, \ldots, C_{15}\}$, which are likewise known from [5], are based on Hadamard sequences that are formed by every 16th row, starting with row 0, of a positionally scrambled Hadamard matrix $H_8$. They are likewise complex sequences that have identical real and imaginary parts.

In particular, the 16 SSCs are formed as follows:

The 16 SSCs (SSC code words) $\{C_0, \ldots, C_{15}\}$ can be obtained by a positional multiplication of a Hadamard sequence by the sequence z that is defined as $z = \langle b, b, b, -b, b, b, -b, -b, b, -b, b, -b, -b, -b, -b, -b\rangle$, wherein it holds that:

$b = \langle x_1, \ldots, x_8, -x_9, \ldots, -x_{16}\rangle = \langle 1, 1, -1, 1, 1, 1, -1, -1, -1, 1, -1, 1, -1, 1, 1, -1\rangle$;

The Hadamard sequences are defined as rows of the matrix $H_8$, $H_8$ being determined by the following recursive definition:

$$H_0 = (1)$$

$$H_k = \begin{pmatrix} H_{k-1} & H_{k-1} \\ H_{k-1} & -H_{k-1} \end{pmatrix}, k \geq 1$$

The rows are enumerated from the top down, starting with 0 for the first row (that is, the row containing only ones).

The nth Hadamard sequence is now defined as the nth row of $H_8$, the rows being enumerated in sequence from the top down with $n = 0, 1, 2, \ldots, 255$.

Let $h_m(i)$ and $z(i)$ respectively be the ith symbol of the sequence $h_m$ and z, respectively, wherein $i = 0, 1, 2, \ldots, 255$, and wherein $i = 0$ refers to the symbol recorded furthest left.

The ith SCH code word, $C_{SCH,i}$, wherein $i = 0, \ldots, 15$ is then defined as $C_{SCH,i} = (1+j) \times \langle h_m(0) \times z(0), h_m(1) \times z(1), h_m(2) \times z(2), \ldots, h_m(255) \times z(255)\rangle$, wherein $m = (16 \times i)$ and the symbol recorded furthest left corresponds to the symbol or chip that is first emitted.

Such an SCH code word is defined for each 16th row of the matrix $H_8$; this yields a total of 16 different SCH code words.

The SSCs, $\{C_0, \ldots, C_{15}\}$, are now defined by these SCH code words, $C_{SCH,i}$, as: $C_i = C_{SCH,i}$, $i = 0, \ldots, 15$.

1. The second synchronization sequences are also denoted below with the aid of SSCi or $SSC_i$, wherein it holds that: $SSCi = SSC_i = C_i = C_{SCH,i}$, $i = 0, \ldots, 15$;

Since, now, one PSC and three SSCs of a code set are emitted in parallel for synchronization purposes, and correlation calculations are carried out at the receiving end for the purpose of synchronization, the grouping of the set of the SSCs to form code sets has an influence on the quality of and the outlay on these correlation calculations, and thus the synchronization or the cell search.

An improved grouping of SSCs to form used code sets is proposed in [5], in which the grouping was determined simply with the aid of the sequence of the SSCs:

Code set 1: $SSC_0, SSC_1, SSC_2$

Code set 2: $SSC_3, SSC_4, SSC_5$

Code set 3: $SSC_6, SSC_7, SSC_8$

Code set 4: $SSC_9, SSC_{10}, SSC_{11}$

The following grouping of SSCs to form used code sets is proposed in [1], in which the grouping was performed using the following rules:

a) select as used SSCs the 12 SSCs from the possible 16 that have the smallest RMS (Root Mean Square) value of the cross correlation relative to the PSC. The RMS value in this case denotes the root of the mean square of the CCF (cross-correlation function) of the SSC's with the PCS. This rule is based on the following finding: if a high cross correlation exists between an SSC and the PCS, it is possible that, in the search for the PSC that is typically carried out by a correlation of the received signal with the PSC, the mobile station could erroneously declare such a high cross correlation with the SSC as PSC.

b) These 12 SSCs are grouped into code sets in such a way that the mean RMS value for all three SSCs located in a code set is also minimized for the worst group.

The following grouping of SSCs to form used code sets resulted in [1] from the application of these criteria:

Code set 1: $SSC_5$, $SSC_8$, $SSC_{11}$

Code set 2: $SSC_0$, $SSC_1$, $SSC_{15}$

Code set 3: $SSC_{12}$, $SSC_{13}$, $SSC_{14}$

Code set 4: $SSC_4$, $SSC_6$, $SSC_{10}$.

However, as will be set forth later on, this selection is not optimal.

The present invention is directed toward specifying a method for synchronizing a receiver with a transmitter, and a method for cell search that permits reliable synchronization.

SUMMARY OF THE INVENTION

Thus, according to the present invention, for the purpose of synchronizing a receiver with a transmitter, a first synchronization signal with a multiplicity of second synchronization signals is transmitted from the transmitter to the receiver, a set of second synchronization signals is subdivided into used code sets and at least one unused code set in such a way that the maximum in the peak values of the cross-correlation functions of the second synchronization signals, which are determined by a used code set, with the first synchronization signal is minimal.

The transmission of a first synchronization signal "with" second synchronization signals also includes the transmission of individual second synchronization signals (for example sequentially), several or all second synchronization signals of a code set being performed during the transmission of the first synchronization signal.

The present invention relates in this case, in particular, to the UTRA TDD mode; the use of second synchronization signals of an unused code set in the UTRA FDD mode even while the PSC is being emitted is therefore not excluded. The present invention also includes the case that the unused second synchronization signals are not regarded as a code set.

The present invention is based in this case on the finding that the RMS (Root Mean Square Value) of the cross-correlation functions CCF is less relevant than the peak value in the CCF.

This is based, in turn, firstly on the requirement for a quick or short PSC search, which has to be carried out as quickly as possible for the following three reasons:

The PSC correlation requires a continuous activation of the radio section and a continuous, high computing power of the baseband section of the mobile station. Consequently, a fast PSC search is required to save energy.

During the first cell search, the frequency of the local oscillator has not yet been calibrated by the signal of the base station, but generally has an increased frequency error. However, an existing frequency error displaces the time base of the mobile station relative to the time base of the base station. It is therefore impossible to accumulate the correlation of the PSC over a lengthy time period and thereby, for example, to obtain a reliable result by averaging.

A maximum in the correlation that is used for the PSC search, that is to say a potential candidate for the PSC search, is verified directly by virtue of the fact that the second and also the third stage of the cell search are carried out with the aid of this hypothesis for the time pattern derived from this maximum. This is more efficient than simply carrying out the PSC correlation and accumulation for a longer time.

Consequently, the portion of the superimposed noise is still relatively high in the case of the PSC search (search for a maximum in the PSC correlation) under these special boundary conditions of a short PSC search. The cross correlation of the PSC with the SSCs are, however, not relevant when they lie below this typically high noise level, and will lead to a significant worsening of detection only when they lie above this level. The probability of erroneous detection rises exponentially with the magnitude of a CCF maximum. Consequently, only the greatest CCF maximal contribute significantly to the erroneous detection.

As a result of the present invention, the first stage of the synchronization, that is to say the detection of a cell or a base station with the aid of a PSC, is performed reliably; in particular, more reliably than in the prior art.

A key finding on which the present invention is based is therefore that, by contrast with the concept on which the proposal [1] is based, what is important is not to minimize the mean RMS value of the cross-correlation functions CCF of the used SSCs with the PSC within a code set of SSCs, but to minimize the maximum in the peak value of the cross-correlation functions of the used SSCs with the PSC.

One embodiment of the present invention provides to undertake the assignment of SSCs to the first code set in such a way that the maximum value of the peak values in the CCF of the SSCs, assigned to the first code set, with the PSC is as low as possible, and then the same criterion for the selection from the SSCs still not assigned to any code set is used for the following code sets.

Such embodiment is based on the finding that the grouping, selected in [1], of the SSCs into code sets in such a way that the RMS is as low as possible within a code set even for the worst code set leads to a lower reliability of synchronization than ensuring that the maximum value of the peak values in the CCF for the first code set is as low as possible, and then making use for the further code sets of the same criterion for the selection from the SSCs still not assigned to any code set.

One advantageous embodiment of the present invention provides for carrying out the grouping of the second synchronization sequences as follows:

Code set 1: SSC1, SSC3, SSC5;

Code set 2: SSC10, SSC13, SSC14;

Code set 3: SSC0, SSC6, SSC12;

Code set 4: SSC4, SSC8, SSC15.

This leads to the following unused second synchronization sequences and to the following unused code set:

SSC2, SSC7, SSC9, SSC11.

Complicated simulations with the aid of simulation tools set up specially for this purpose lead in the case of the application of the criteria according to the present invention to this special grouping of second synchronization sequences. Appropriate results are summarized in the following tables:

TABLE 1 maximum peak values in the CCF of the respective code set of the SSCs for a grouping into code sets in accordance with an advantageous refinement of the invention: select the SSCs with the lowest peak value in the CCF with the PSC; group the SSCs thus selected in such a way relative to code sets that the maximum of the peak values in the CCF of the SSCs is minimized within each code set.

| Code set | | CCF of SSC with PSC | | Maximum peak value in the CCF |
|---|---|---|---|---|
| | | Peak value | RMS | of the respective code set of the SSCs |
| 1 | $SSC_5$ | 67 | 9.93 | 75 |
| | $SSC_1$ | 67 | 11.28 | |
| | $SSC_3$ | 75 | 12.58 | |
| 2 | $SSC_{14}$ | 77 | 11.87 | 79 |
| | $SSC_{10}$ | 77 | 11.24 | |
| | $SSC_{13}$ | 79 | 11.48 | |

TABLE 1-continued maximum peak values in the CCF of the respective code set of the SSCs for a grouping into code sets in accordance with an advantageous refinement of the invention: select the SSCs with the lowest peak value in the CCF with the PSC; group the SSCs thus selected in such a way relative to code sets that the maximum of the peak values in the CCF of the SSCs is minimized within each code set.

| Code set | | CCF of SSC with PSC | | Maximum peak value in the CCF of the respective code set of the SSCs |
|---|---|---|---|---|
| | | Peak value | RMS | |
| 3 | $SSC_{12}$ | 79 | 11.62 | 81 |
| | $SSC_6$ | 79 | 11.65 | |
| | $SSC_0$ | 81 | 10.49 | |
| 4 | $SSC_{15}$ | 83 | 11.48 | 89 |
| | $SSC_8$ | 83 | 12.10 | |
| | $SSC_4$ | 89 | 11.90 | |
| Unused | $SSC_{11}$ | 99 | 10.46 | |
| | $SSC_7$ | 99 | 12.91 | |
| | $SSC_9$ | 109 | 12.31 | |
| | $SSC_2$ | 111 | 12.13 | |

TABLE 2 maximum peak values in the CCF of the respective code set of the SSCs for a grouping into code sets in accordance with [1].

| Code set | | CCF of SSC with PSC | | Maximum peak value in the CCF of the respective code set of the SSCs |
|---|---|---|---|---|
| | | Peak value | RMS | |
| 1 | $SSC_5$ | 67 | 9.93 | 99 |
| | $SSC_8$ | 83 | 12.10 | |
| | $SSC_{11}$ | 99 | 10.46 | |
| 2 | $SSC_0$ | 81 | 10.49 | 83 |
| | $SSC_1$ | 67 | 11.28 | |
| | $SSC_{15}$ | 83 | 11.48 | |
| 3 | $SSC_{12}$ | 79 | 11.62 | 79 |
| | $SSC_{13}$ | 79 | 11.48 | |
| | $SSC_{14}$ | 77 | 11.87 | |
| 4 | $SSC_4$ | 89 | 11.90 | 89 |
| | $SSC_6$ | 79 | 11.65 | |
| | $SSC_{10}$ | 77 | 11.24 | |
| Unused | $SSC_2$ | 111 | 12.13 | |
| | $SSC_3$ | 75 | 12.58 | |
| | $SSC_7$ | 99 | 12.91 | |
| | $SSC_9$ | 109 | 12.31 | |

TABLE 3 maximum peak values in the CCF of the respective code set of the SSCs for a grouping into code sets in accordance with [5].

| Code set | | CCF of SSC with PSC | | Maximum peak value in the CCF of the respective code set of the SSCs |
|---|---|---|---|---|
| | | Peak value | RMS | |
| 1 | $SSC_0$ | 81 | 10.49 | 111 |
| | $SSC_1$ | 67 | 11.28 | |
| | $SSC_2$ | 111 | 12.13 | |
| 2 | $SSC_3$ | 75 | 12.58 | 89 |
| | $SSC_4$ | 89 | 11.90 | |
| | $SSC_5$ | 67 | 9.93 | |
| 3 | $SSC_6$ | 79 | 11.65 | 99 |
| | $SSC_7$ | 99 | 12.91 | |
| | $SSC_8$ | 83 | 12.10 | |

TABLE 3-continued maximum peak values in the CCF of the respective code set of the SSCs for a grouping into code sets in accordance with [5].

| Code set | | CCF of SSC with PSC | | Maximum peak value in the CCF of the respective code set of the SSCs |
|---|---|---|---|---|
| | | Peak value | RMS | |
| 4 | $SSC_9$ | 109 | 12.31 | 109 |
| | $SSC_{10}$ | 77 | 11.24 | |
| | $SSC_{11}$ | 99 | 10.46 | |
| Unused | $SSC_{12}$ | 79 | 11.62 | |
| | $SSC_{13}$ | 79 | 11.48 | |
| | $SSC_{14}$ | 77 | 11.87 | |
| | $SSC_{15}$ | 83 | 11.48 | |

TABLE 4 summary of the maximum peak values in the CCF for each code set for the three proposals.
Maximum peak values in the CCF of the complete set of the SSCs

| Design variant of the invention | Proposal in [1] | Current specification |
|---|---|---|
| 89 | 99 | 111 |
| 81 | 89 | 109 |
| 79 | 83 | 99 |
| 75 | 79 | 89 |

Another development of the present invention provides that for the purpose of synchronization the transmitted synchronization sequences are further processed at the receiving end, such as in a mobile station, in particular in the form of correlation calculations.

Additional features and advantages of the present invention are described in, and will apparent from, the following Detailed Description of the Invention and the Figures.

DETAILED DESCRIPTION OF THE INVENTION

Figure 1:
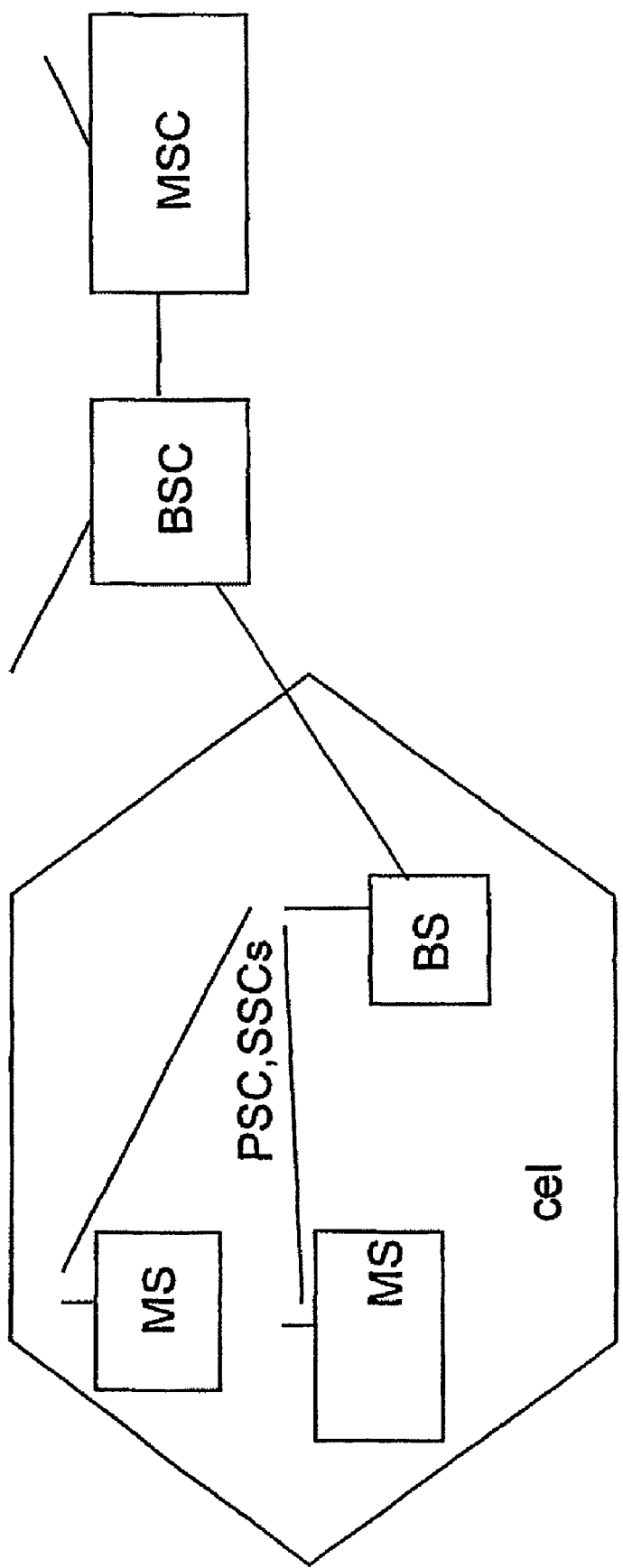
FIG. 1 shows a block diagram of the principle of a mobile radio system in connection with the teachings of the present invention.

Illustrated in FIG. 1 is a cellular mobile radio network that constitutes, for example, a UMTS (Universal Mobile Telecommunication System) system that includes a multiplicity of mobile switching centers MSC that are networked together and furnish the access to a fixed network. Furthermore, these mobile switching centers MSC are connected to, in each case can at least one base station controller BSC that also can be formed by a data processing system.

Each base station controller BSC is connected, in turn, to at least one base station BS. Such a base station BS is a radio station that can set up a radio link to other radio stations, so-called mobile stations MS, via a radio interface. Information can be transmitted via radio signals between the mobile stations MS and the base station BS assigned to these mobile stations MS. The range of the radio signals of a base station, or a number thereof in the individual case, essentially define a radio cell.

Base stations BS and a base station controller BSC can be combined to form a base station system. The base station system is also responsible in this case for the radio channel administration and/or allocation, the data rate matching, the monitoring of the radio transmission link, handover procedures, and for the allocation of the spread code sets to be used, and communicates the signaling information required therefor to the mobile stations MS.

The UMTS system and the corresponding components of mobile stations and/or base stations can communicate in this case in the UTRA-TDD mode and/or in the UTRA-FDD mode.

The base stations BS emit a first synchronization signal PSC for a first cell search or the first step of a synchronization of a base station with a mobile station. In parallel with the PSC, the base stations emit a multiplicity of second synchronization signals SSC for a second step of a synchronization of a base station with a mobile station. In this process, for UTRA FDD and UTRA TDD, the multiplicity of second synchronization signals SSC transmitted in parallel with the PSC are extracted from the same quantity or the same set of 16 prescribed second synchronization sequences.

Depending on the mode or modes in which the base stations are being operated, however, the multiplicity of second synchronization signals SSC that are sent with the PSC are determined by different code sets into which the 16 SSCs are grouped.

The set of 16 SSCs is grouped in this case into five code sets in the UTRA TDD, of which four code sets, which include three SSCs in each case, are used for synchronization in UTRA TDD, and one code set, which includes four SSCs, is not used for synchronization in UTRA TDD. Three SSCs of a code set are then emitted in parallel with the PSC for the purposes of synchronization in the time slots to which a PSCH (Primary Synchronization Channel) is assigned.

Figure 2:
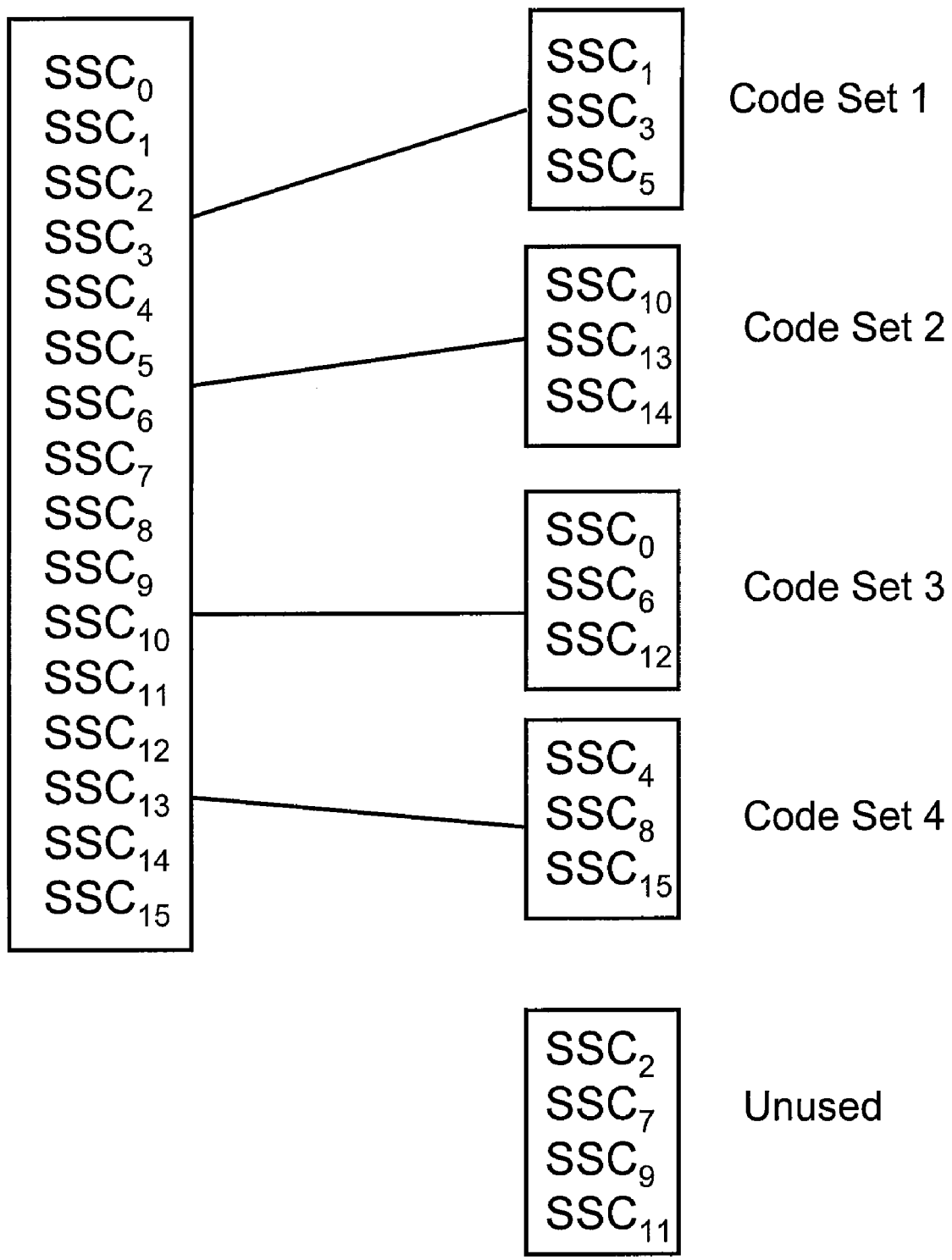
FIG. 2 illustrates an exemplary grouping of second synchronization signals into code sets.

The grouping of the second synchronization signals into used code sets is performed as follows in this case, and is illustrated in FIG. 2:

Code set 1: SSC1, SSC3, SSC5;

Code set 2: SSC10, SSC13, SSC14;

Code set 3: SSC0, SSC6, SSC12;

Code set 4: SSC4, SSC8, SSC15.

The PSC and SSCs are formed in this case by methods specified above.

The determination of the temporal position of the first synchronization sequence PSC and of the temporal sequence of the multiplicity of second synchronization sequences SSCs is performed in the mobile stations via correlation calculations. In this process, the synchronization sequence of the PSC is compared over the entire frame at each possible position with the received signal, typically by using a so-called matched filter. In the process, all possible cross correlations of the SSCs with the PSC also occur, and so the entire cross-correlation function must be investigated in an optimization of the SSCs. The first synchronization sequence is used for time slot synchronization, and the multiplicity of second synchronization sequences are used for frame synchronization and for detecting further system parameters.

In a further embodiment of the present invention, it is possible to utilize the fact that the following SSCs all have the same peak value in the CCF with the PSC:

$SSC_{13}$, $SSC_{12}$, $SSC_6$.

It follows that there are three different possible selections for the formation of the code sets (two that are additional to the above-mentioned exemplary embodiment), which all permit an (approximately) identical probability of detection. Here, use is made in each case of one of these SSCs ($SSC_{13}$, $SSC_{12}$, $SSC_6$) in the second code set. In a preferred refinement, use is made in this case of $SSC_6$ for the third code set, in order to achieve a smaller difference in the RMS values between the sets. Although, as represented above, the RMS value is not the primarily decisive criterion, it nevertheless can be advantageous to make such a selection as a subordinate criterion.

In a further embodiment of the present invention, it is taken into account that a frequency error that can typically be approximately 10 kHz can occur during the first cell search. In this refinement, the selection of the code sets is then carried out as a function of the CCF in the case of a frequency error. The selection criterion specified above is then extended to the effect that use is made not of the values of the CCF without frequency error, but of the values of the CCF with frequency error, or to the effect that use is made of a compromise between the best code sets with and without frequency error.

It is taken into account in a further embodiment that the SSCs of a group can be transmitted simultaneously; the individual SSCs being modulated, however, with a value from the group {+1, −1, +j, −j}. In this embodiment, it is not the properties of the CCF of the individual SSCs that are optimized with the PSC, but the CCF of the various possible combinations of the modulated SSCs with the PSC. In this case, the selection can be carried out in a way similar to that described above; in particular, taking account of the same criteria as described above.

Although the present invention has been described with reference to specific embodiments, those of skill in art will recognize that changes may be made thereto without departing from the spirit and scope of the present invention as set forth in the hereafter appended claims.

This application refers to the following documents, specifically:

[1] Mitsubishi Electric, "Optimized code sets for PSCH in UTRA TDD", 3GPP TSG RAN WG1#13 Tdoc R1-00-0626, Tokyo, Japan, May 22nd-25th, 2000

[2] Siemens, Texas Instruments, "Generalised Hierarchical Golay Sequence for PSC with low complexity correlation using pruned efficient Golay correlations", TSG-RAN Working Group 1 (Layer 1) Meeting #5, Tdoc 567/99, Cheju Island, Korea, 01.-04.06.1999.

[5] 3rd Generation Partnership Project; Technical Specification Group Radio Access Network; "Spreading and modulation (TDD)"; 3G TS 25.223 V3.2.0 (2000-03).

The invention claimed is:

1. A method for synchronizing a receiver with a transmitter, the method comprising the steps of:
   transmitting from the transmitter to the receiver a first synchronization signal with a plurality of second synchronization signals which are taken from a set of second synchronization signals that are subdivided into code sets;
   determining the plurality of second synchronization signals that can be transmitted jointly by a respective code set; and
   grouping the code sets into used code sets and at least one unused code set;
   wherein the set of second synchronization signals are subdivided into code sets such that a maximum in the peak values of cross-correlation functions of used code sets of the second synchronization signals with the first synchronization signal is minimized.

2. A method for synchronizing a receiver with a transmitter as claimed in claim 1, wherein the method is used in a TDD mode of a UMTS.

3. A method for synchronizing a receiver with a transmitter as claimed in claim 1, wherein all the synchronization signals of the set of second synchronization signals are used for synchronization in a FDD mode of a UMTS system.

4. A method for synchronizing a receiver with a transmitter as claimed in claim 1, wherein the first synchronization signal is a hierarchic sequence, and the second synchronization signals are obtained in each case by positional multiplication of the first synchronization signal by one row of a Hadamard matrix.

5. A method for synchronizing a receiver with a transmitter as claimed in claim 1, wherein the synchronization signals are formed as follows:

the first synchronization signal $C_p$ is determined by the following relationship:

$C_p = <y(0), y(1), y(2), \ldots, y(255)>$, wherein it holds that:

$y = (1+j) \times <a, a, -a, -a, a, -a, -a, a, a, a, -a, a, -a, a, a>$, wherein it holds that:

$a = <x_1, x_2, x_3, \ldots, x_{16}> = <1, 1, 1, 1, 1, 1, -1, -1, 1, -1, 1, -1, 1, -1, -1, 1>$;

16 second synchronization signals $\{C_0, \ldots, C_{15}\}$ are determined by the relationship:

$C_i = C_{SCH,i}$, $i = 0, \ldots, 15$, wherein it holds that:

$C_{SCH,i} = (1+j) \times <h_m(0) \times z(0), h_m(1) \times z(1), h_m(2) \times z(2), \ldots, h_m(255) \times z(255)>$, wherein it holds that:

$m = (16 \times i)$ the nth Hadamard sequence $h_n$ is a series of a Matrix $H_8$, which can be formed recursively by the relationship:

$$H_0 = (1)$$
$$H_k = \begin{pmatrix} H_{k-1} & H_{k-1} \\ H_{k-1} & -H_{k-1} \end{pmatrix}, k \geq 1,$$

the numbering beginning at the top with zero, $n = 0, 1, 2, \ldots, 255$;

$h_m(i)$ and $z(i)$ denote the ith symbol of the sequence $h_m$ and $z$, respectively, wherein $i = 0, 1, 2, \ldots, 255$ and $i = 0$ corresponds to the symbol at far left.

6. A method for synchronizing a receiver with a transmitter as claimed in claim 1, wherein the used code sets are defined as follows:

Code set 1: SSC1, SSC3, SSC5;
Code set 2: SSC10, SSC13, SSC14;
Code set 3: SSC0, SSC6, SSC12;
Code set 4: SSC4, SSC8, SSC15.

7. A method for synchronizing a receiver with a transmitter as claimed in claim 1, wherein a temporal position of the first synchronization sequence and a temporal position of the plurality of second synchronization sequences are determined at a receiving end via correlation calculations.

8. A method for synchronizing a receiver with a transmitter as claimed in claim 1, wherein the first synchronization sequence is used at a receiving end for time slot synchronization, and the plurality of second synchronization sequences are used for frame synchronization.

9. A method for synchronizing a receiver with a transmitter as claimed in claim 1, wherein, for a minimization criterion, the maximum and the peak values of the cross-correlation functions of the second synchronization signals, which are determined by a used code set, is also taken into account with the aid of the first synchronization signal in conjunction with at least one frequency error.

10. A method for synchronizing a receiver with a transmitter as claimed in claim 1, wherein, for a plurality of alternatives with the same maximum in the peak values of the cross-correlation functions of the second synchronization signals, which are determined by a used code set, with the first synchronization signal, an RMS value of the cross-correlation function is minimized as subordinate criterion.

11. A method for synchronizing a receiver with a transmitter as claimed in claim 1, wherein the maximum in the peak values of the cross-correlation functions is minimized by modulated superpositions of second synchronization signals, which are determined by a used code set, with the first synchronization signal.

12. A method for synchronizing a receiver with a transmitter, the method comprising the steps of:

transmitting, via the transmitter, a first synchronization signal with a plurality of second synchronization signals;

determining the plurality of second synchronization signals that can be transmitted jointly by a grouping of second synchronization signals into code sets; and forming the code sets such that a maximum in peak values of cross-correlation functions of the second synchronization signals with the first synchronization signal is minimized.

13. A method for selecting a plurality of second synchronization signals that are transmitted jointly with a first synchronization signal, the method comprising the steps of:

selecting the plurality of second synchronization signals from a set of second synchronization signals;

subdividing the set of second synchronization signals into code sets; and grouping the code sets into used code sets and at least one unused code set;

wherein the set of second synchronization signals is subdivided into codes sets such that a maximum in peak values of cross-correlation functions of the second synchronization signals, which are contained in a used code set, with the first synchronization signal is minimized.

* * * * *